United States Patent [19]

Park

[11] Patent Number: 5,379,506
[45] Date of Patent: Jan. 10, 1995

[54] DEVICE FOR REMOVING/INSERTING AN OZONE FILTER FROM AND INTO AN ELECTROPHOTOGRAPHIC APPARATUS

[75] Inventor: Kyung-Ho Park, Ahnsan, Rep. of Korea

[73] Assignee: SamSung Electronics Co., Ltd., Suwon, Rep. of Korea

[21] Appl. No.: 150,737

[22] Filed: Nov. 12, 1993

[30] Foreign Application Priority Data

Nov. 13, 1992 [KR] Rep. of Korea ............ 21314/1992

[51] Int. Cl.⁶ ........................................ B23P 11/02
[52] U.S. Cl. .................................. 29/426.6; 29/451; 29/453; 55/493
[58] Field of Search ............... 29/163.8, 426.1, 426.2, 29/426.5, 426.6, 451, 453; 355/215; 55/493, 507

[56] References Cited

U.S. PATENT DOCUMENTS

| | | |
|---|---|---|
| 1,491,868 | 4/1924 | Kunkel . |
| 1,604,470 | 10/1926 | Newnham ............ 55/507 |
| 3,789,514 | 2/1974 | Faust et al. . |
| 3,966,442 | 6/1976 | Waters . |
| 4,124,362 | 11/1978 | Westlin et al. . |
| 4,204,960 | 5/1980 | Sugiyama et al. ............ 55/507 |
| 4,269,616 | 5/1981 | Fitzke et al. ............ 55/493 |
| 4,366,344 | 12/1982 | Sheehan ............ 29/453 |
| 4,385,911 | 5/1983 | Popell et al. . |
| 4,612,603 | 9/1986 | Cook ............ 29/426.6 |
| 4,669,167 | 6/1987 | Asterlin ............ 29/451 |
| 4,840,650 | 6/1989 | Matherne . |
| 4,853,735 | 8/1989 | Kodama et al. ............ 355/215 |
| 5,026,407 | 6/1991 | Tobey . |
| 5,030,264 | 7/1991 | Klotz et al. . |
| 5,125,941 | 6/1992 | Ernst et al. . |
| 5,128,110 | 7/1992 | Soga et al. . |
| 5,203,893 | 4/1993 | Horii ............ 355/215 |
| 5,221,303 | 6/1993 | Gühne et al. . |

Primary Examiner—Mark Rosenbaum
Assistant Examiner—David P. Bryant
Attorney, Agent, or Firm—Robert E. Bushnell

[57] ABSTRACT

A process and device enabling easy and reliable placement of an ozone filter (4) from and into a frame member (1) of an electrophotographic apparatus. The device uses a pair of slots (3) formed on both sides of a filter mounting recess (2) and a filter holder (5) which includes, as a unit, a portion provided with the ozone filter (4), a pair of tension members (6) with raised edges for engaging with the pair of slots to affix the filter holder within the filter mounting recess (2) when the filter holder (5) is inserted into the filter mounting recess (2), and grip members (8) for handling the filter holder (5). Grip members (8), when pressed towards each other, produce a tension and allow the filter holder (4) to be quickly and easily removed from or inserted into the filter mounting recess (2).

20 Claims, 4 Drawing Sheets

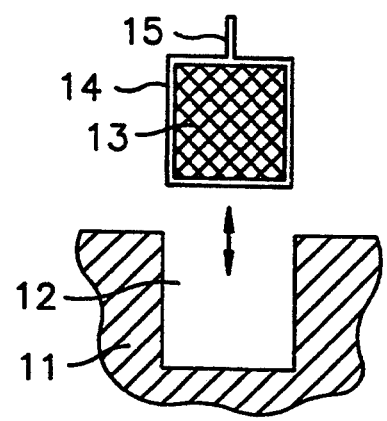
*FIG. 1*
"CONVENTIONAL"
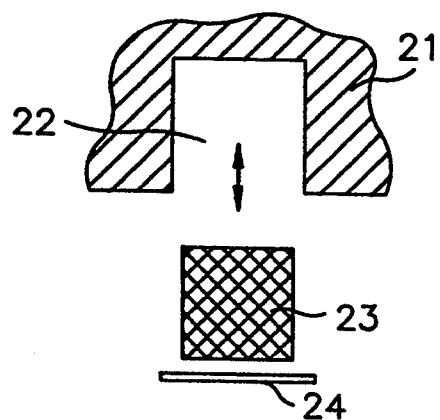
*FIG. 2*
"CONVENTIONAL"

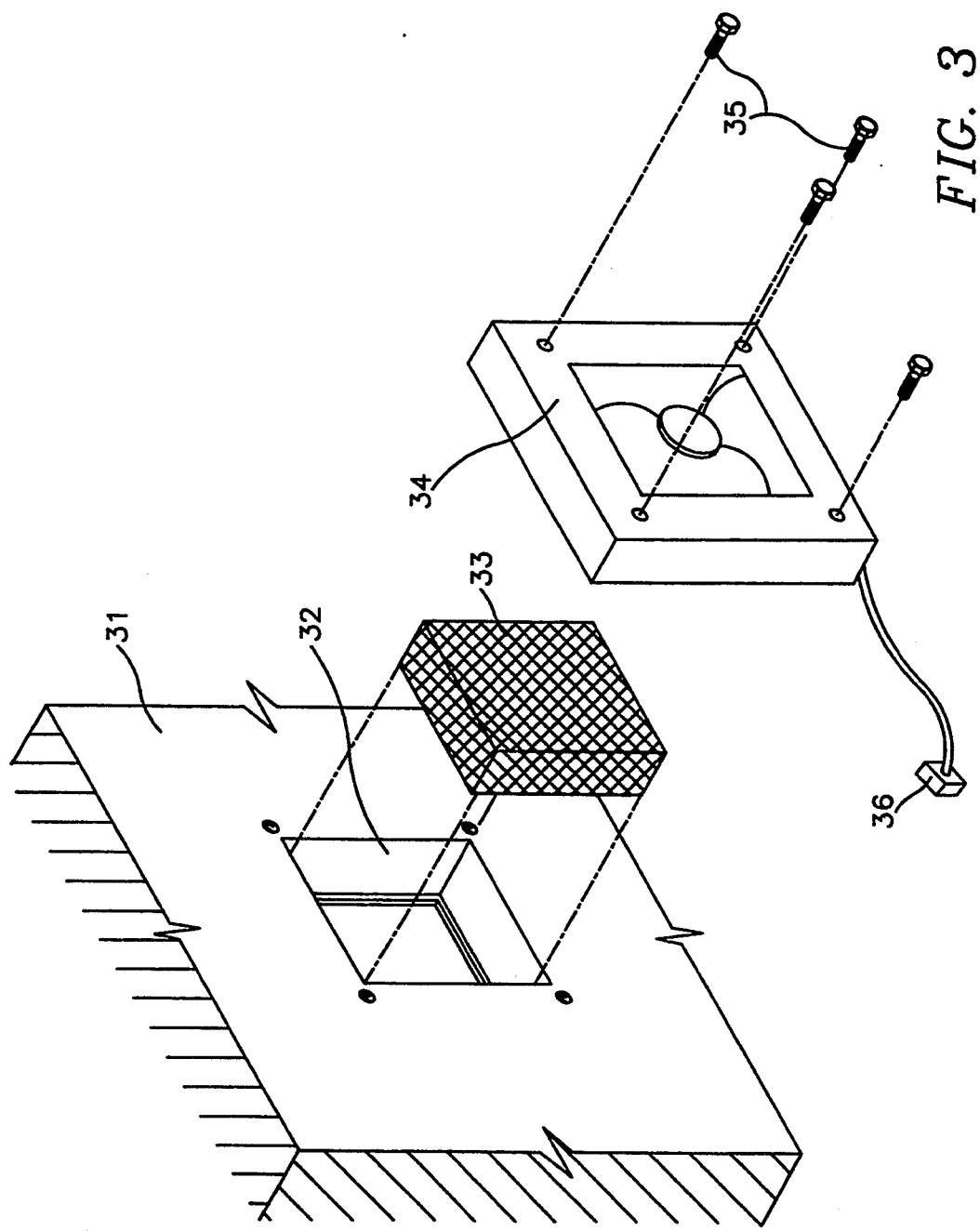
FIG. 3
"CONVENTIONAL"

DEVICE FOR REMOVING/INSERTING AN OZONE FILTER FROM AND INTO AN ELECTROPHOTOGRAPHIC APPARATUS

BACKGROUND OF THE INVENTION

The present invention relates to a device for removing and inserting an ozone filter from and into an electrophotographic apparatus, and more particularly to an improved removing or inserting device that easily removes or inserts a filter holder provided with an ozone filter from and into a frame member of the main body of the electrophotographic apparatus.

Contemporary electrophotography printing devices produce ozone during operation that is generally recognized to be harmful to the human body. An ozone filter is used to reduce the density of ozone to a level below a stable reference level. To do so however, the ozone filter must be changed after having been used for a prescribed time period. When being changed, the ozone filter is contaminated with dust particles. Accordingly, if the ozone filter is touched by human hands, the hands will become contaminated with particles from the filter and also with other dust.

There are Several types of ozone removing apparatus described in the art. None however, have the advantage of allowing filter replacement without contamination of the user's hands. One such apparatus provided by the Ozone Removing Device issued to Y. Kodama shows an ozone removing device that uses a container holding a quantity of an ozone removing agent with a filter attached to the mouth of the container. In this embodiment, removal of the filter without contact is virtually impossible.

A more recent effort is the Ozone Filter Unit For An Electrophotographic Apparatus in U.S. Pat. No. 5,203,893 by Y. Horii; this reference shows a filter case with a pivoting filter holding frame into which an ozone filter element is inserted. Although the ozone filter element is provided with a grippable lug for insertion and removal, the lug is in close proximity with the actual filter portion such that removal of the filter element without contamination of the human machine operator is difficult.

SUMMARY OF THE INVENTION

Accordingly, it is an object of the present invention to provide an improved process and device for inserting and removing an ozone filter.

It is another object to provide a process and a device enabling insertion and removal of an ozone filter without the hands of an operator touching the filter element.

It a still another object to provide a process and device enabling accurate and reliable insertion and retention of a filter element within a receptacle.

It is yet another object to provide a process and device providing filtering of ozone generated by a machine while occupying a minimum of space within that machine.

It is still yet another object to provide a compact and easily manufactured device providing filtering of machine generated ozone.

It is also an object to provide a device for assuring quick and secure insertion and removal of an ozone filter from a machine.

These and other objects may be achieved according to the principles of the present invention with a pair of slots on first and second sides of a filter mounting slot formed within a frame member of the main body of an electrophotographic apparatus. A filter holder which fits within the filter mounting slot, has first and second ends and is provided with an ozone filter. Tension members having raised edges formed on an external center portion extend, outwardly from the first and second ends of the filter holder. The raised edge means engage with the pair of slots on the first and second sides of the filter mounting hole and lock the filter holder within the filter mounting slot. Gripping members with raised edges positioned thereon are provided for handling the filter holder and for releasing and inserting the filter holder from and within the filter mounting slot.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is an operational diagram illustrating a conventional device for removing and inserting an ozone filter;

FIG. 2 is an operational diagram illustrating another conventional device for removing and inserting an ozone filter;

FIG. 3 is an exploded perspective view illustrating placement of an ozone filter in a third conventional device;

DETAILED DESCRIPTION OF THE DRAWINGS

Figure 4:
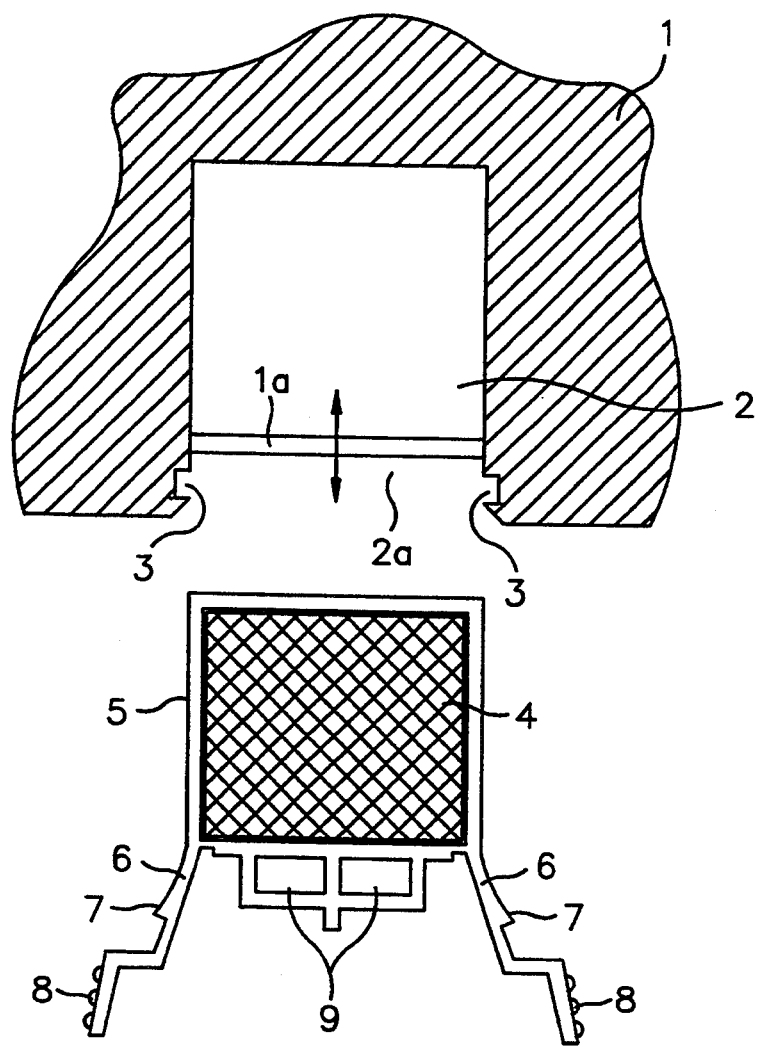
FIG. 4 is an operational diagram illustrating insertion and removal of an ozone filter in an embodiment constructed according to the principles of the present invention.

Many conventional methods for removing and inserting an ozone filter from and into an electrophotographic device have been developed over the years. These methods have a common disadvantage in that they do not prevent hand contamination since they require user contact with the filter during replacement.

Turning now to the drawings, a first of these conventional methods is shown in FIG. 1 where a filter mounting opening 12 is formed into a frame member 11 of the main body of the electrophotographic apparatus. A pad 14 provided with an ozone filter 13 is fixed within the filter mounting opening 12 by inserting pad 14 with the aid of a grip member 15 mounted on the pad. When the ozone filter 13 is replaced, pad 14 is pulled and separated from filter mounting hole 12 through use of grip member 15. Pad 14 is usually composed of a sponge-like material while the grip member 15 is a film-like material. Therefore, due to the lack of rigidity of these materials, replacement of the ozone filter 13 without undesired direct contact between the contaminated filter and the hands of a human machine operator is difficult.

A second of these conventional methods is represented in FIG. 2 where an ozone filter 23 is pushed into a filter mounting hole 22 formed in the main body of the electrophotographic apparatus. The ozone filter 23 is attached to an externally positioned filter cover 24 which is fixed in place. When the ozone filter 23 is to be replaced however, the filter cover 24 is detached while ozone filter 23 is manually grasped by the human machine operator and pulled from the interior of filter mounting hole 22. Then, a new ozone filter is manually grasped by the hand of the machine operator and inserted into filter mounting hole 22, and filter cover 24 is re-attached to the ozone filter 23. Therefore, since filter cover 24 (which contacts the used filters) is continually re-used and handled, replacement of the ozone filter 23 without contamination of the hands, and possibly the clothing, of the machine operator becomes nearly impossible. This method also has a problem of reduced reliability every time the filter cover is removed due to deteriorating adhesive strength of a layer of adhesive holding cover 24 onto filter 23.

A third of these conventional methods is shown in FIG. 3 where a square filter mounting hole 32 is formed in the frame member 31 of the main body of the electrophotographic apparatus and an ozone filter 33 is inserted into the filter mounting hole 32. A fan 34 for dissolving ozone is externally fixed to the frame member 31 with bolts 35 and a connector 36 for the fan 34 is used. When the ozone filter 33 is replaced, the connector 36 for the fan 34 is unplugged, the blots 35 are loosened, the fan is completely removed and the ozone filter is released. Then, a new ozone filter is inserted into the filter mounting hole 32 of the frame member 31, and the fan 34 is again fixed to the frame member 31 with the bolts 35. Therefore, it is again extremely difficult to replace the ozone filter without contaminating contact. Also, this method is particularly burdensome because it requires the machine operator to loosen and replace several threaded fasteners by, for example, unscrewing bolts before and after the ozone filter is replaced.

Turning now to FIG. 4, an exploded plan view for inserting and removing an ozone filter 4 into an electrophotographic apparatus according to the principles of the present invention is illustrated. A frame member 1 of the main body of the electrophotographic apparatus includes a filter mounting recess 2 having a lead-in opening 2a and first and second sides. The filter mounting recess 2 is formed within the frame member 1 and has a pair of slots 3 formed within its first and second sides. Tension members 6 extend outwardly from first and second ends of a filter holder 5. The filter holder 5 is preferably composed of plastic and is provided with an ozone filter 4. On the external center of each tension member 6 there is provided a raised edge 7. Accordingly, when the filter holder 5 is inserted into the filter mounting recess 2, the raised edges 7 on the tension members 6 are fixedly secured within the slots 3. A pair of grip members 8 are formed on ends of the tension members 6. Between each tension member 6 there is formed a thermal exhaust port 9 for exhausting internal heat of the electrophotographic apparatus. Referring specifically to frame member 1, a duct guide 1a is provided for generating air flow which eliminates the ozone. Accordingly, the filter 4 is installed on an upper part of the duct guide 1a and air flow is provided on the lower part of the duct guide 1a.

Figure 5:
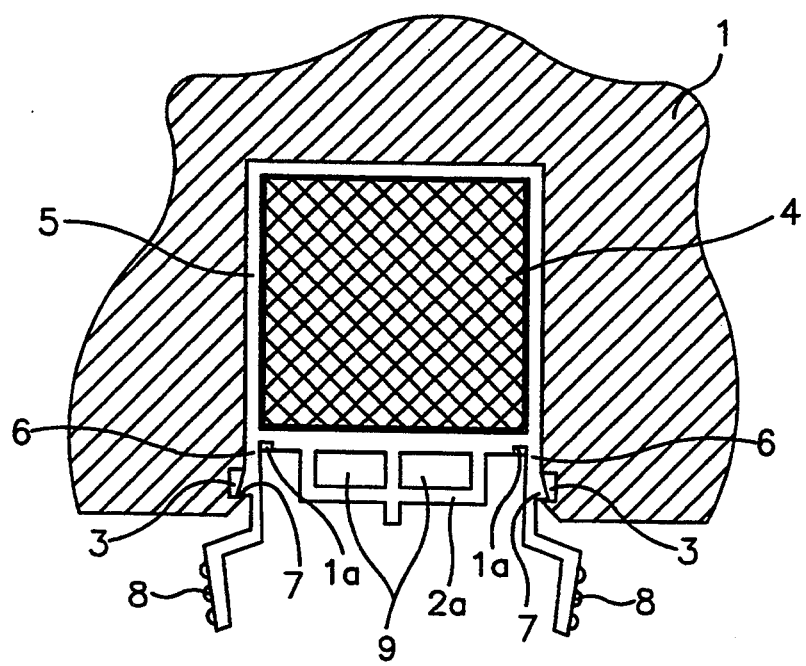
FIG. 5 is a partial cross-sectional view illustrating placement of an ozone filter according to the principles of the present invention in an electrophotographic apparatus, showing the filter portion in an installed position.

The operation of removing and inserting the ozone filter, based on the aforementioned embodiment, is described in detail, as follows. Referring again to FIG. 4, the grip members 8 are flexed inwardly as a lead-in portion of filter holder 5 is inserted into filter mounting recess 2 through lead-in opening 2a. Once filter holder 5 is fully inserted, grip members 8 are released so that tension members 6 spring back by their restoring force. At this point, slots 3 of the frame member 1, formed on first and second sides of the filter mounting recess 2, engage respective raised edges 7 of tension members 6, affixing filter holder 5 into filter mounting recess 2 as shown in FIG. 5. It is preferable that each raised edge 7 fit within each slot 3 as shown in FIG. 5, i.e., each raised edge not entirely filling each slot. This removes the necessity for maintaining overly narrow manufacturing tolerances when producing the device, while concomitantly assuring that each raised edge 7 securely and repeatedly engages the corresponding slot 3, regardless of how many times filter holder 5 has been removed and reinserted into recess 2. It is recognized however, that the aforementioned device could be constructed so that there is a near perfect fit between the raised edge 7 and the slot 3.

When the installed ozone filter 4 is replaced by a new filter, the grip members 8 are flexed inwardly thus releasing the raised edges 7 from the slots 3. Accordingly, if the grip members 8 are drawn away from frame member 1, the filter holder 5 is removed and separated from the filter mounting recess 2, as shown in FIG. 4. A new ozone filter may then be quickly inserted into the filter mounting recess 2 by the previously described method, with the assurance that filter holder 5 will be securely retained within recess 2, without the necessity for the machine operator to touch either the filter media element 4 or the interior of recess 2 or the surrounding regions of recess 2 such as lead-in opening 2a.

Therefore, when practiced according to the principles of the present invention, an ozone filter can be easily changed and contamination of a user's hands can be prevented.

What is claimed is:

1. A device for mounting an ozone filter within a filter mounting recess formed in a frame member of an electrophotographic apparatus, said device comprising:
    first and second slots respectively formed on first and second sides of said filter mounting recess; and
    first and second tension members outwardly extended respectively from first and second ends of a filter holder surrounding said ozone filter, each said tension member having a raised edge formed on a center portion and a grip member formed on a first end portion, each said raised edge of each said tension member being insertable into a corresponding one of said first and second slots to affix said filter holder within said filter mounting recess.

2. The device for mounting an ozone filter as claimed in claim 1, wherein said filter holder has a square circumference and is composed of plastic.

3. The device for mounting an ozone filter as claimed in claim 2, wherein said filter holder further comprises a portion accommodating an exhaust port to exhaust internal heat from the apparatus, said exhaust port being positioned between said first and second tension members.

4. The device for mounting an ozone filter as claimed in claim 3, wherein each said raised edge fits within said corresponding one of said first and second slots such that each one of said first and second slots is not completely filled by each corresponding said raised edge.

5. The device for mounting an ozone filter as claimed in claim 3, wherein each said raised edge fits within said corresponding one of said first and second slots such that each one of said first and second slots is completely filled by each corresponding said raised edge.

6. The device for mounting an ozone filter as claimed in claim 1, wherein each said raised edge fits within said corresponding one of said first and second slots such that each one of said first and second slots is not completely filled by each corresponding said raised edge.

7. The device for mounting an ozone filter as claimed in claim 6, wherein said filter holder further comprises a portion accommodating an exhaust port to exhaust internal heat from the apparatus, said exhaust port being positioned between said first and second tension members.

8. The device for mounting an ozone filter as claimed in claim 6, wherein said filter holder has a square circumference and is composed of plastic.

9. The device for mounting an ozone filter as claimed in claim 1, wherein each said raised edge fits within said corresponding one of said first and second slots such that each one of said first and second slots is completely filled by each corresponding said raised edge.

10. The device for mounting an ozone filter as claimed in claim 1, wherein said first and second tension members are resiliently biased to spring back away from each other after being flexed inwardly towards each other and then released.

11. A method for inserting an ozone filter media into a filter mounting recess formed within a frame member of a main body of an electrophotographic apparatus, comprising the steps of:
grasping first and second tension members outwardly extending respectively from first and second ends of an ozone filter holder surrounding said ozone filter media;
pressing said first and second tension members towards each other until first and second raised edges respectively positioned on said first and second tension members are within a predetermined range of distances from each other;
inserting said ozone filter holder into said filter mounting recess formed within said frame member of said main body of said electrophotographic apparatus; and
releasing said first and second tension members so that said first and second raised edges engage corresponding first and second slots respectively formed on first and second sides of said filter mounting recess.

12. The method for inserting an ozone filter media as claimed in claim 11, wherein each of said first and second tension members comprises a grip member formed on a fist end portion to enable said grasping of each corresponding said first and second tension members.

13. A process for removing an ozone filter media from a filter mounting recess formed within a frame member of a main body of an electrophotographic apparatus, comprising the steps of:
grasping first and second tension members outwardly extending respectively from first and second ends of an ozone filter holder surrounding said ozone filter media;
pressing said first and second tension members towards each other until first and second raised edges respectively positioned on said first and second tension members are respectively withdrawn from first and second slots respectively formed on first and second sides of said filter mounting recess; and
removing said ozone filter media from said filter mounting recess formed within said frame member of said main body of said electrophotographic apparatus by withdrawing said ozone filter holder from said filter mounting recess.

14. The method for removing an ozone filter media as claimed in claim 13, wherein each of said first and second tension members comprises a grip member formed on a first end portion to enable said grasping of each corresponding said first and second tension members.

15. A device for mounting an ozone filter media into a filter mounting recess formed within a frame member of an electrophotographic apparatus, said filter mounting recess having first and second sides with first and second slots respectively formed therein, said device comprising:
a filter holder surrounding and supporting said ozone filter media;
first and second tension members outwardly extending respectively from first and second ends of said filter holder; and
first and second raised edge portions respectively positioned-on said first and second tension members, said first and second raised edge portions respectively engaging said first and second slots of said filter mounting recess when said ozone filter media is mounted within said filter mounting recess.

16. The device for mounting an ozone filter media as claimed in claim 15, wherein said filter holder has a square circumference and is composed of plastic.

17. The device for mounting an ozone filter media as claimed in claim 15, wherein each said raised edge portion fits within a corresponding one of said first and second slots when said ozone filter media is mounted within said filter mounting recess such that each one of said first and second slots is not completely filled by each corresponding said raised edge portion.

18. The device for mounting an ozone filter media as claimed in claim 15, wherein each of said first and second tension members comprises a grip member formed on a first end portion to enable physical gripping of each corresponding said first and second tension members.

19. The device for mounting an ozone filter media as claimed in claim 15, wherein said filter holder is further comprised of a portion accommodating an exhaust port to exhaust internal heat from the electrophotographic apparatus, said exhaust port being positioned between said first and second tension members.

20. The device for mounting an ozone filter media as claimed in claim 15, wherein said first and second tension members are resiliently biased to spring back away from each other after being flexed inwardly towards each other and then released.

* * * * *

UNITED STATES PATENT AND TRADEMARK OFFICE
CERTIFICATE OF CORRECTION

PATENT NO. : 5,379,506
DATED : Jan. 10, 1995
INVENTOR(S) : Kyung-Ho Park

It is certified that error appears in the above-indentified patent and that said Letters Patent is hereby corrected as shown below:

Column 1, Line 25, Change "Several" to --several-- .

Column 5, Line 54, Change "fist" to --first-- ;

Column 6, Line 30, Change "positioned-on" to --positioned on-- .

Signed and Sealed this

Fourteenth Day of November, 1995

Attest:

BRUCE LEHMAN

Attesting Officer

Commissioner of Patents and Trademarks